May 26, 1942.   G. L. HINEMAN   2,284,148
ANTISHIMMY DEVICE
Filed Feb. 17, 1939   2 Sheets-Sheet 1
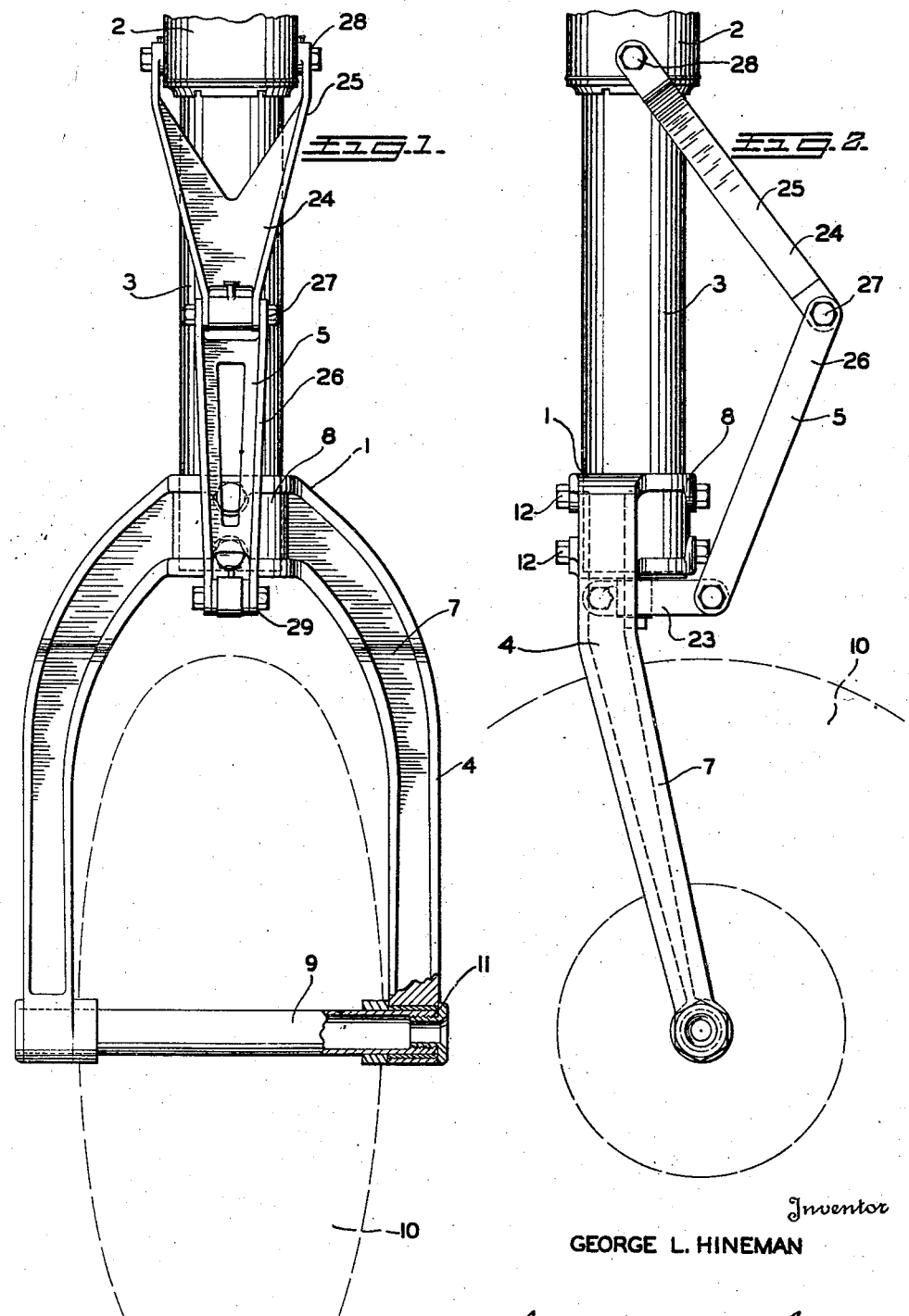
Inventor
GEORGE L. HINEMAN

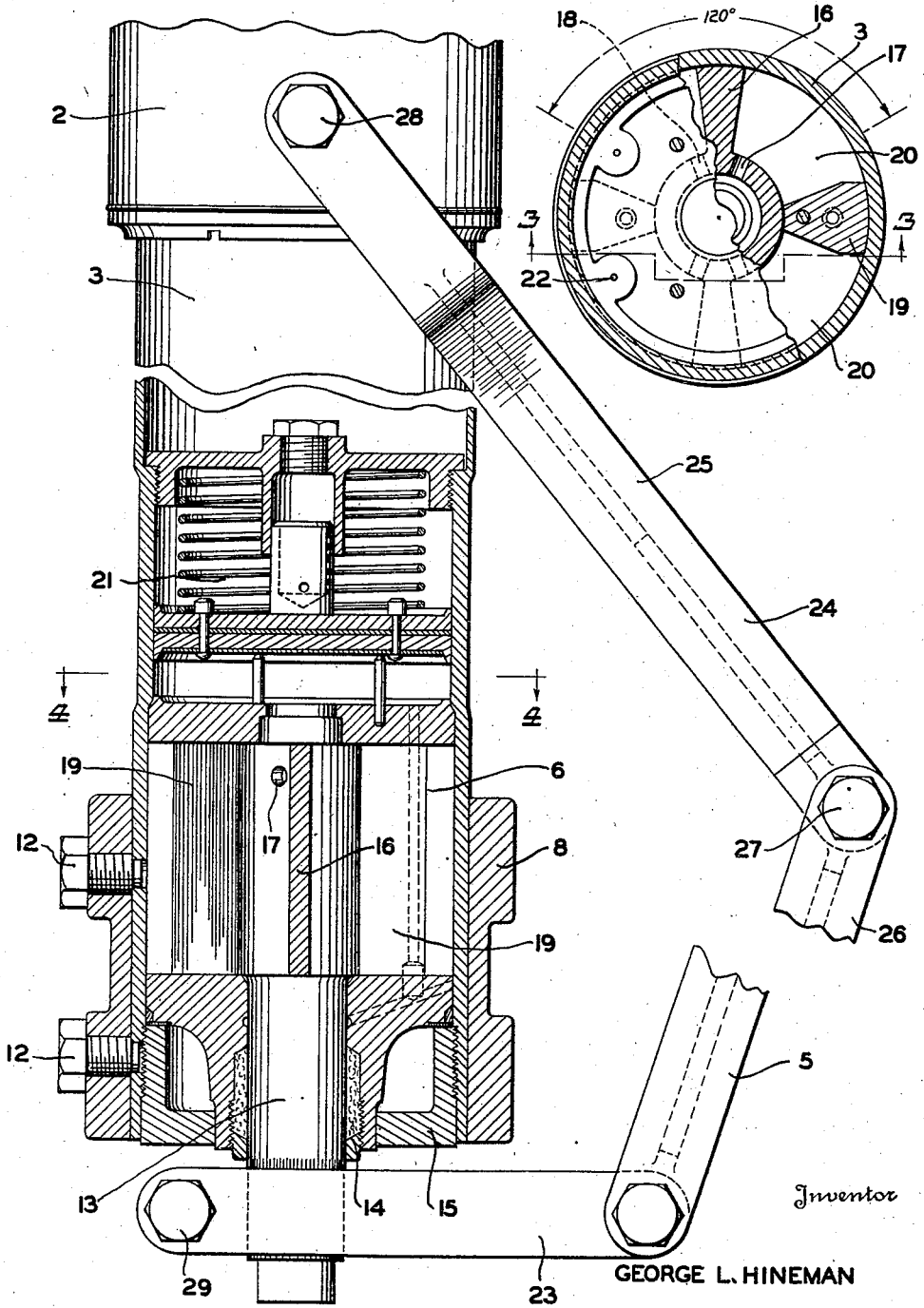

Patented May 26, 1942

2,284,148

UNITED STATES PATENT OFFICE 2,284,148

ANTISHIMMY DEVICE

George L. Hineman, Buffalo, N. Y., assignor to Bell Aircraft Corporation, Buffalo, N. Y., a corporation of New York Application February 17, 1939, Serial No. 256,839½

12 Claims. (Cl. 244—104)

This invention relates to airplane landing gear construction, and more especially to a means by which the swiveling movement of a landing wheel of the caster type may be dampened and controlled.

One of the objects of my invention is to provide an anti-shimmy device for an airplane, the operation of which will dampen the swiveling movement of a landing wheel of the caster type.

Another object of my invention is to provide an anti-shimmy device, the operation of which will limit the swiveling movement of a landing wheel of the caster type to a predetermined arc.

Still another object of my invention is to provide an anti-shimmy device of the type described, which when mounted on the rear wheel of an airplane will dampen and control the swiveling movement of the wheel without preventing the airplane from being pivoted upon this wheel.

A further object of my invention is to provide an anti-shimmy device of the type described, which may be mounted on the landing gear of an airplane without increasing the drag or preventing the use of a retractible landing gear.

With these and other objects in view, my invention embraces the concept of providing a dampener, the operation of which will eliminate shimmy of a landing wheel of a caster type of an airplane by dampening the swiveling movement of the wheel. The operation of this device also limits the maximum arc through which the wheel may rotate and may be used in connection with a wheel strut of any construction, such as the oleo strut. This device does not increase the drag of the airplane and may be used on retractible landing gears.

In the drawings:

Figure 1 is a fragmental view of a rear portion of an oleo strut in rear elevation.

Figure 2 is a side elevational view of the fragment of the oleo strut shown in Figure 1.

Figure 3 is a longitudinal, sectional view partly in elevation of a portion of the compressible leg shown in Figure 2, without the wheel fork assembly.

Figure 4 is a view taken along line 4—4 of Figure 3 looking in the direction of the arrows.

In order to illustrate my invention, I have shown in the drawings a portion of the compression leg of a swivel landing wheel for an airplane which is of the air cushioning, oleo type and is generally designated by the numeral 1. This oleo strut 1 comprises a cylinder 2, the upper end of which is provided with means, not shown, to attach the strut to the fuselage of the airplane, a reciprocating and rotatable portion 3, a wheel assembly 4, a linkage 5, and an antishimmy dampener assembly 6.

The wheel assembly 4 is composed of a wheel fork 7 which is provided with a centrally located collar 8. A landing wheel axle 9, upon which is mounted a landing wheel indicated at 10, is journaled in the extremities of the wheel fork 7 as indicated at 11. The collar 8 is rigidly mounted on the lower extremity of the reciprocating portion 3 and is held in position by suitable screws 12 which engage aligned apertures located in the collar 8 and the reciprocating portion 3.

The reciprocating portion 3 consists of a hollow tube which is slidably mounted within the cylinder 2 in such a manner that it acts as a shock dampener. In this type of construction the reciprocating portion 3 normally can freely rotate within the cylinder 2, thereby allowing the wheel assembly a free rotative movement. The principal feature of this invention is to supply means to limit this rotative movement to a predetermined arc and to dampen this rotative movement.

As best shown in Figures 3 and 4, this anti-shimmy dampener consists of a radial piston 13 which extends through a packing gland 14 carried by a bottom closure member 15 of the reciprocating portion 3. This radial piston 13 is provided with a pair of integrally formed and diametrically opposed vanes 16 which extend to the inner walls of the reciprocating tube 3, thereby dividing this cylinder into two portions. These portions are connected by means of conduits 17 and 18 which extend through the hub of the piston 13.

The inner surface of the tube 3 is provided with a pair of integrally formed vanes 19 which are disposed on opposite sides of the tube and extend inwardly to the hub of the piston 13 and further subdivide the interior of the tube 3. When the wheel assembly 4 is aligned in the direction of the movement of the airplane, the vanes 16 and 19 are opposed at right angles to each other and divide the interior of the tube 3 into four equal sized wells 20. These wells 20 carry a constant volume of fluid, such as an oil. A compressible element and plunger arrangement 21 is provided to maintain a constant supply of this oil to these wells through suitable valve controlled orifices 22.

The piston 13 is held against rotation with respect to the portion 3 by means of the linkage 5 which consists of an arm 23 and a broken link 24. The arm 23 is horizontally mounted on the portion of the piston 13 which is situated outside the tube 3 and below the oil gland 14.

As best shown in Figure 1, the broken link 24 consists of two links 25 and 26 having bifurcated ends which are pivoted as shown at 27. The opposite end of the link 25 is also bifurcated and is pivotally mounted on opposed sides of the cylinder 2 as indicated at 28. The bifurcated lower end of the link 26 is mounted on the outer extremity of the arm 23 as shown at 29. By this arrangement, the piston 13 is prevented from rotating but the broken link permits lineal movement of the tube 3 within the cylinder 2.

In operation, a rotative movement of the wheel assembly 4 will cause a corresponding rotative movement of the tube 3. This movement of the tube 3 causes the vanes 19 to move towards the stationary vanes 16, thereby reducing the size of two of the wells 20 and causing an increase in pressure of the fluid contained within these wells. This increase in pressure forces the fluid in these wells through the restricted orifices 17 and 18 into the opposite wells, thereby causing a retardation or dampening of the rotary movement of the tube 3. The maximum movement in the dampener shown in Figure 4 is 60° on either side of the center line allowing an equal angular movement of the nose wheel of the airplane which allows the airplane to be pivoted about one of its rear wheels. The range of angular movement may be varied, however, and this may become necessary if the landing wheels are not located at equal lateral distances. When the rotative movement is in a direction opposed to that just described, the oil is again forced through the aperture 17 and 18 so as to equalize the pressure within the four wells 20. Obviously, the device may be used on the tail wheel of a conventional landing gear with the same anti-shimmy results.

From the above description it is believed obvious that I have provided a dampening device which positively controls or eliminates shimmy in landing wheels of the caster type. By using this device instead of the ordinary friction or self-centering device, ground handling is improved, and, if the device is used on the nose wheel, manual control through the shimmy range is not necessary.

While for purposes of illustration I have described one type of strut in which my invention may be used, it is obvious that it can be used on any type of strut and will eliminate shimmy from any type of landing wheel. Moreover, the size of the arc through which the wheel is permitted to move may be varied depending on the type of wheel and the control desired without departing from the spirit and scope of this invention. I, therefore, wish to be limited only by the prior art and the scope of the appended claims.

I claim:

1. In a landing gear for a flying machine, a shock absorbing telescopic strut element adapted to be rigidly attached to the flying machine, a second shock absorbing strut element adapted to telescope with said first strut element and constructed and arranged to have rotational movement relative to said first element, the combination of a vibration damping mechanism comprising an hydraulic piston and cylinder, said cylinder being non-rotatably associated with and forming a continuation of said second mentioned strut element, said piston operating in said cylinder, and means connected to said piston and adapted for connection with respect to said first mentioned strut element for holding said piston from rotation with respect to said first mentioned strut element.

2. In a landing device for aircraft, an oleo shock absorber including two telescoping cylinders capable of relative rotation, a ground engaging member operatively carried by one of said cylinders, and rotation snubbing means extending from one to the other of said cylinders and carried thereby for retarding said relative rotation.

3. In a landing device for aircraft, an oleo shock absorber including a pair of telescoping cylinders one secured to the aircraft against rotation and the other rotatable relative to the former, a ground engaging member operatively carried by the rotatable cylinder, a torque resisting element secured to the non-rotatable cylinder and extending to the rotatable cylinder, and rotation retarding means between said element and said rotatable cylinder.

4. In a landing device for aircraft, a support including a duality of substantially vertical and telescoping cylinders capable of relative rotation, a ground engaging member operatively carried by the lower of said cylinders, a rotation retarding mechanism including a pair of relatively movable elements, a rigid connection between one of said elements and one of said cylinders, and a flexible connection between the other of said elements and the other of said cylinders preventing relative rotation therebetween but enabling telescopic movement of said cylinders.

5. In a landing device for aircraft of the type having an oleo shock absorber consisting of a pair of telescoping cylinders, one of which is held against rotational movement, and the other of which is capable of longitudinal and rotational movement with respect to the non-rotatable cylinder and which carries a ground engaging member, the improvement comprising rotation snubbing means supported by one of said cylinders, and a torque member operatively connected to said rotation snubbing means and supported by the other of said cylinders whereby relative rotation of said cylinder is retarded.

6. In a landing device for aircraft of the type having an oleo shock absorber consisting of a pair of telescoping cylinders, one of which is held against rotational movement and the other of which is capable of longitudinal and rotational movement with respect to the non-rotatable cylinder and which carries a ground engaging member, the improvement comprising rotation snubbing means supported by one of said cylinders, and a link member attached to the other of said cylinders and operatively connected to said rotation snubbing means whereby relative rotation of said cylinder is retarded.

7. In a landing device for aircraft of the type having an oleo shock absorber consisting of a pair of telescoping cylinders, one of which is held against rotational movement and the other of which is capable of longitudinal and rotational movement with respect to the non-rotatable cylinder and which carries a ground engaging member, the improvement comprising rotation snubbing means supported by one of said cylinders, a link operatively connected to said rotation snubbing means and a second link pivotally attached to said first mentioned link and attached to the other of said cylinders whereby relative rotation of said cylinder is retarded.

8. In a landing gear for aircraft, a shock absorbing telescopic strut adapted to be rigidly attached to the aircraft, a second shock absorbing strut adapted to telescope with said first strut and constructed and arranged to have rotational movement relative to said first strut, the combination of a vibration dampening mechanism comprising a hydraulic piston and cylinder, the said cylinder being non-rotatably associated with and forming a continuation of said second strut, said piston operating in the said cylinder, and link means connected at one end to the piston and at the opposite end to the first strut adapted to permit reciprocatory movement of the second strut yet maintain said piston against rotation with respect to the first strut.

9. In a landing device for aircraft, an oleo shock absorber consisting of a pair of telescoping cylinders, one of which is secured to the aircraft against rotation and the other of which is rotatable relative to the former, a ground engaging member carried by the said rotatable cylinder, rotation retarding means supported by said rotatable cylinder and a torque resisting element attached to the non-rotatable cylinder and operatively connected to said rotation retarding means whereby relative rotation of the rotatable cylinder with respect to the non-rotatable cylinder is retarded.

10. In a landing device for aircraft, a support consisting of a duality of substantially vertical and telescoping cylinders capable of relative rotation, a ground engaging member supported by the lower of said cylinders, a rotation snubbing mechanism comprising a pair of relatively movable elements, a connection between one of said elements and one of said cylinders, and a link connection between the other of said elements and the other of said cylinders preventing relative rotation therebetween yet enabling telescopic movement of said cylinders.

11. In a landing device of the oleo type for aircraft which includes two telescoping cylinders capable of relative rotation, a ground engaging member supported by the lower of said cylinders, rotation snubbing means supported by one of said cylinders and a flexible torque element extending from said rotation snubbing means to the other of said cylinders whereby relative rotation is retarded.

12. In a landing device for aircraft, an oleo shock absorber consisting of a pair of telescoping cylinders, one of which is secured to the aircraft against rotation and the other of which is capable of rotary movement with respect to the other, a ground engaging member carried by the rotatable cylinder, hydraulic rotation snubbing means supported by one of said cylinders, and a torque element located exteriorly of the cylinders and operatively connected at one end with said hydraulic snubbing means and at the opposite end with one of said cylinders whereby relative rotation of the cylinders is retarded.

GEORGE L. HINEMAN.